United States Patent [19]

Seidou

[11] Patent Number: 5,470,283
[45] Date of Patent: Nov. 28, 1995

[54] SPEED REDUCTION DEVICE

[76] Inventor: Yoshio Seidou, 101-13 Aokubo, Oshi Nagano-Ken, Japan

[21] Appl. No.: 179,561

[22] Filed: Jan. 10, 1994

[51] Int. Cl.$^6$ .................................................. F16H 1/28
[52] U.S. Cl. ........................ 475/162; 475/177; 464/103
[58] Field of Search ................................. 475/162, 176, 475/177, 178, 196; 464/102, 103

[56] References Cited

U.S. PATENT DOCUMENTS

| | | | |
|---|---|---|---|
| 606,158 | 6/1898 | Belanger | 475/177 |
| 3,043,164 | 7/1962 | Sundt | 475/162 |
| 4,177,695 | 12/1979 | Grove | 475/162 |
| 5,030,184 | 7/1991 | Rennerfelt | 475/162 |
| 5,232,412 | 8/1993 | Zheng et al. | 475/162 |

FOREIGN PATENT DOCUMENTS

WO8201923  6/1982  WIPO ................................. 475/162

*Primary Examiner*—Kholo Ta
*Attorney, Agent, or Firm*—Lyon & Lyon

[57] ABSTRACT

A speed reduction device employing a housing with rotatably mounted input and output shafts. The input shaft includes an eccentric shaft upon which is rotatably mounted a gear wheel. The gear wheel meshes with a ring gear fixed to the housing. The gear wheel has close but not equal to the same number of teeth as the ring gear. A dynamic coupling is provided between the gear wheel and the output shaft. The dynamic coupling includes circular cavities on opposed surfaces on the gear wheel and output shaft, respectively, with balls located between surfaces in the cavities. One set of cavities is enlarged to accommodate the eccentric motion of the gear wheel.

9 Claims, 2 Drawing Sheets

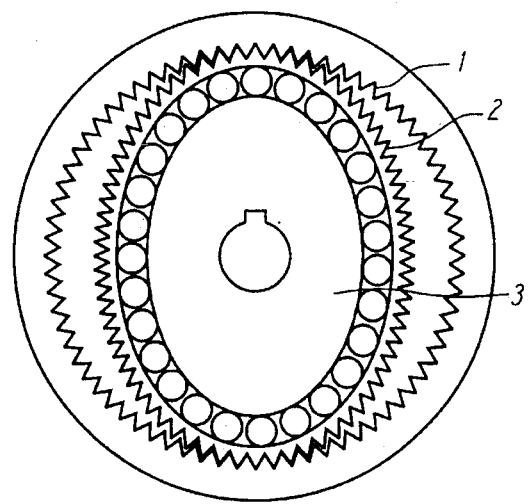
*FIG. 1*
(PRIOR ART)
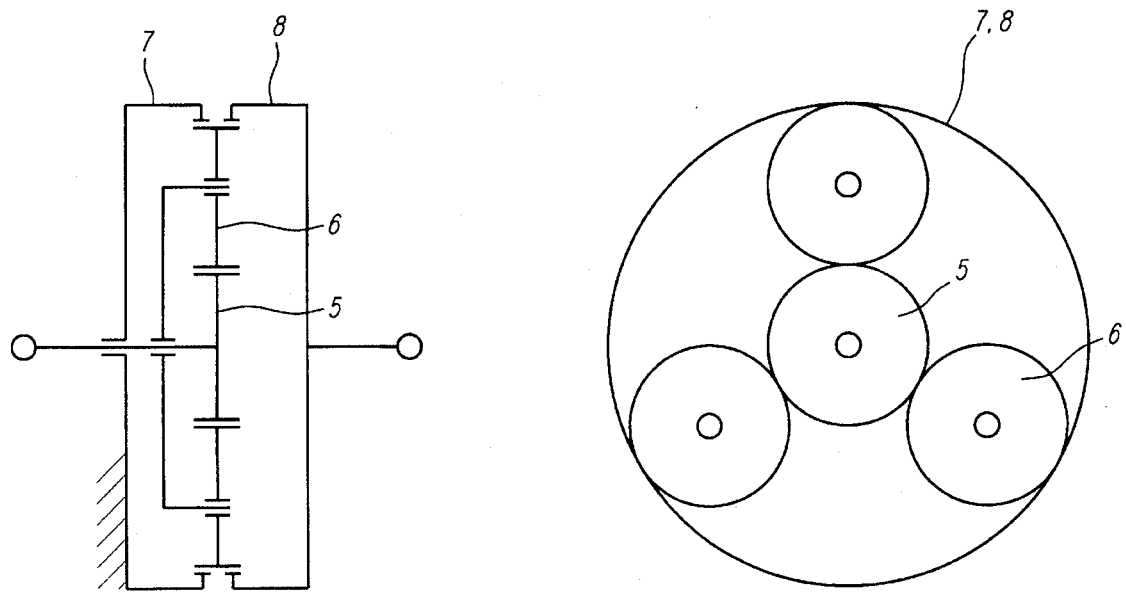
*FIG. 2*
(PRIOR ART)
*FIG. 3*
(PRIOR ART)

SPEED REDUCTION DEVICE

BACKGROUND OF THE INVENTION

The field of the present invention is speed reduction transmissions applicable to machinery devices in, for example, robots, automobiles, machine tools and electrical tools.

In a wide variety of applications, it is desirable to reduce the speed of a rotary output using a power transmission system. Two such systems are commonly known, a harmonic drive system and a Ferguson drive system. Both offer a high speed reduction ratio. The harmonic drive system, as shown in FIG. 1, is such a device which provides substantial speed reduction employing an elliptically shaped wave generator rotatably driven within a ring gear. A ring gear 1 with inner teeth surrounds an elastic gear 2 rotatably arranged outwardly of an elliptical shaft 3. The elliptical shaft 3 is driven to generate a wave in the elastic gear with the elastic gear engaged diametrically with the teeth of the ring gear 1. The elastic gear 2 is caused to rotate by this system in the opposite direction to the wave generator 3 at a speed dependent upon the difference in the number of teeth between the elastic gear 2 and the ring gear 1. Such a harmonic drive system is difficult to construct, requiring a high level of manufacturing technology.

The Ferguson drive system as illustrated in FIGS. 2 and 3 also carries out significant speed reduction. The sun gear 5 is driven. The planetary gears 6 rotate and revolve about the sun gear 5. The ring gear 7 is fixed. The ring gear 8 provides the output. The ring gears 7 and 8 have different numbers of teeth and the output speed of the ring gear 8 depends upon this difference. The Ferguson drive system has substantial gear wheel diameter disparity which can be disadvantageous, particularly as to the noise generated.

SUMMARY OF THE INVENTION

The present invention is directed to a speed reduction device which can be compact in size, low in cost and operate at a low noise level.

In a first and separate aspect of the invention, an eccentric rotary shaft moves a gear wheel mounted concentrically about the shaft and free to rotate. The gear wheel engages a fixed ring gear. The rotation of the gear wheel is dynamically coupled to an output shaft to provide substantial gear reduction.

In a second and separate aspect of the present invention, the foregoing device employs a dynamic coupling including opposed surfaces on the gear wheel and the output shaft with cavities therein. Balls are positioned within the cavities such that each ball engages a cavity on the gear wheel and a cavity on the output shaft, respectively.

Accordingly, it is an object of the present invention to provide an improved gear reduction device for significant gear reduction ratios. Other and further objects and advantages will appear hereinafter.

BRIEF DESCRIPTION OF THE DRAWINGS

FIG. 1 is a schematic side view of a prior art harmonic drive system.

FIG. 2 is a schematic side view of a gear drive train for a Ferguson drive system.

FIG. 3 is a schematic side view of the system of FIG. 2.

DETAILED DESCRIPTION OF THE PREFERRED EMBODIMENT

Figure 4:
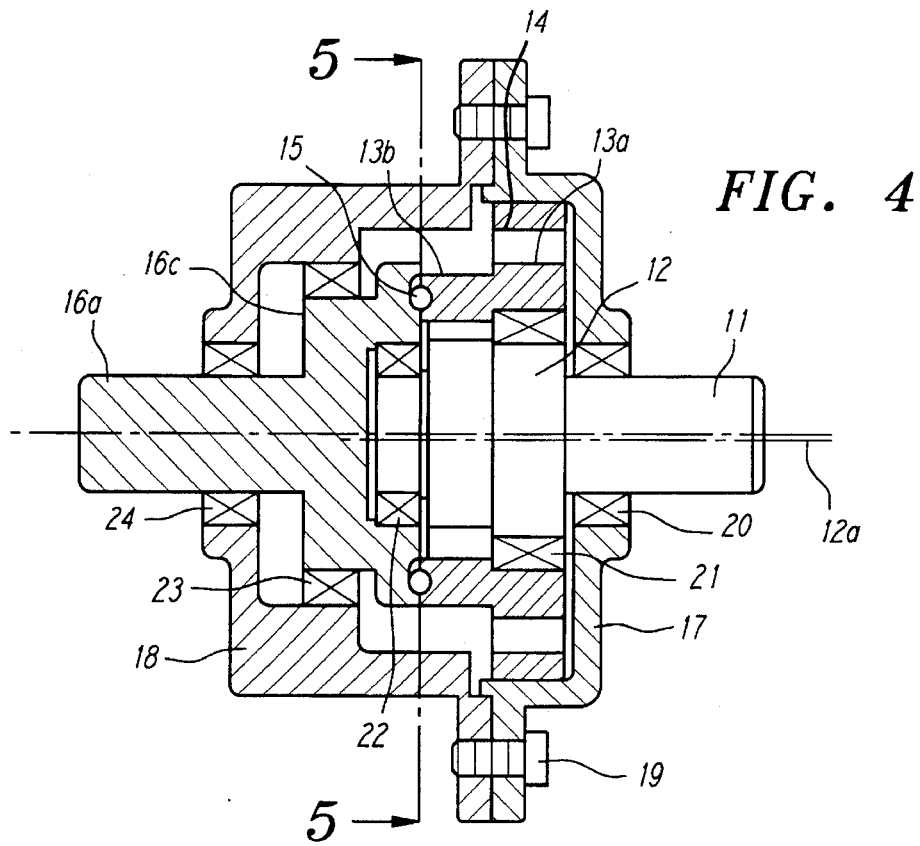
FIG. 4 is a cross-sectional side view of a gear reduction device.
Figure 5:
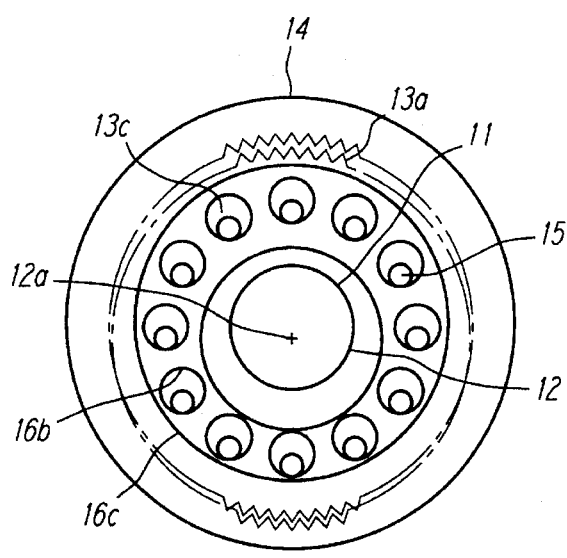
FIG. 5 is a schematic cross-sectional view of the device of FIG. 4 taken along line 5—5 of FIG. 4 and illustrating in superposition the hub and cavities of the opposed face.
Figure 6:
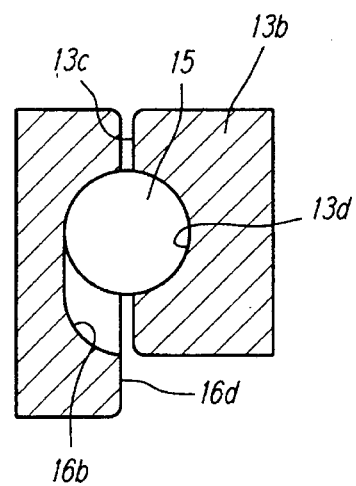
FIG. 6 is a cross-sectional detail view illustrating a ball and cavities of the dynamic coupling of the device of FIG. 4.

Turning in detail to FIGS. 4, 5 and 6, a speed reduction device is disclosed as including a housing of two parts 17 and 18 held together by fasteners 19. Rotatably mounted within the housing is an input shaft 11. The input shaft 11 is supported on the part 17 of the housing by a bearing 20. Fixed to the input shaft 11 is an eccentric shaft 12 contained within the housing. The eccentric shaft 12 includes an axis 12a displaced laterally from the axis of the shaft 11 by an eccentric radius.

Supported on the eccentric shaft 12 is a circular bearing 21. In turn supported by the circular bearing 21 is a circular gear wheel 13a. Thus, the gear wheel 13a is concentrically mounted about the eccentric shaft 12 and free to rotate relative to the eccentric shaft 12 because of the bearing 21. The gear wheel 13a has external teeth. Fixed to the part 17 of the housing is a ring gear 14 with internal teeth. The ring gear 14 is concentrically arranged about the input shaft 11 with the eccentric gear wheel 13a within the ring gear 14. The teeth of the ring gear 14 are engaged with the teeth of the gear wheel 13a. Because the gear wheel 13a is smaller and because of the eccentric mounting of the gear wheel 13a on the eccentric shaft 12, the teeth of the ring gear 14 and the gear wheel 13a only mesh along a limited space. The number of teeth on the gear wheel 13a is different than the number of teeth on the ring gear 14.

The part 18 of the housing also rotatably mounts an output shaft 16a. The shaft 16a is mounted within a bearing 24. The shaft 16a includes a hub 16c of greater diameter than the shaft 16a. This hub is also supported in the housing by a bearing 23. To assist in the mounting of the input shaft 11, a bearing 22 is positioned between one end of the shaft 11 and an inner diameter of the hub 16c.

A dynamic coupling is provided between the gear wheel 13a and the output shaft 16a. The gear wheel 13a includes a cylindrical axial extension 13b. A first surface 13c is arranged perpendicular to the axis of the gear wheel 13a. A second surface 16d is provided by the hub 16c which is perpendicular to the axis of the shaft 16a and closely faces the first surface 13c of the gear wheel 13a. The two surfaces 13c and 16d are separated by a small distance as they must move relative to one another.

The first surface 13c includes a series of cavities 13d which have a surface which is of a constant radius of curvature to form a portion of a spherical surface. Balls 15 are positioned within the cavities 13d. The radius of curvature of the cavities is substantially equal to the radius of the balls 15. In the present embodiment, 12 balls 15 are illustrated and are positioned in 12 cavities 13d.

Cavities 16b are located in the second surface 16d and are larger than the cavities 13d to accommodate the relative motion between the first surface 13c and the second surface 16d. To accommodate this motion, the cavities 16b are circular at the edge and are substantially equal to the diameter of the balls 15 plus twice the eccentric radius of the gear wheel 13a. The cavities 16b are arranged to match with the surface of the balls 15, thereby defining a pan shape with the surface inwardly curved toward the bottom. Technically, this surface of the cavities 16b is generated by a constant radius curve which has a radius of curvature substantially equal to the radius of the balls. The surface is a surface of rotation generated by the generating curve about an axis with the center of curvature being displaced from that axis by the eccentric radius of the eccentric shaft 12. Thus, the gear wheel 13a and the output shaft 16a are caused to rotate at the same speed.

In operation, the input shaft 11 is powered. This causes the gear wheel 13a to move in an orbit with the center of the gear wheel 13a being displaced from the axis of the input shaft 11 by the eccentric radius of the eccentric shaft 12. Because of the meshing of the gear wheel 13a with the ring gear 14, and because of the stationary positioning of the ring gear 14, the gear wheel 13a is caused to rotate according to the difference in the number of teeth between the gear wheel 13a and the ring gear 14. The orbital motion and rotation of the gear wheel 13a is transferred through the dynamic coupling to the output shaft 16a. The rotational power transferred from the gear wheel 13a to the shaft 16a is provided by the dynamic coupling through the surfaces 13c and 16d by means of the balls 15. Because of the orbital motion of the gear wheel 13a, the balls will move about the outside surface of the larger cavities 16d. By using hard material such as steel in forming the components of the dynamic coupling, low friction and low energy loss can be realized. In this embodiment, the gear wheel 13a has one less tooth than the ring gear 14. This provides for the ring gear 13a to rotate in a direction opposite to that of the input shaft 11 at a much reduced rotational speed.

With the gear wheel 13a having one less tooth than the ring gear 14, the speed reduction ratio may be described as follows:

$$\frac{N_r - N_w}{N_w}$$

where:

$N_r$=number of teeth on the ring gear 14

$N_w$=number of teeth on the gear wheel 13a

For example, if the number of teeth on the ring gear 14 is 101 and the number of teeth on the gear wheel 13a is 100, then the speed reduction ratio is 1/100.

The foregoing preferred embodiment employs two gears 13a and 14 of a much smaller size disparity than, for example, the Ferguson drive. Thus, the contact area between gears is relatively large, keeping noise to a minimum. The dynamic coupling, contemplating the use of hard materials, is also relatively low friction and does not generate excessive noise. The simplicity of the system and small number of components also accommodates compact construction. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A speed reduction device comprising a housing;

an input shaft to rotate in the housing;

an eccentric shaft to rotate with the input shaft;

a ring gear outside of the eccentric shaft, concentric with the input shaft and fixed to the housing;

a gear wheel to rotate on the eccentric shaft and engaging the ring gear, the ring gear and the gear wheel having different numbers of teeth;

an output shaft to rotate in the housing coaxially with the input shaft;

a dynamic coupling between the gear wheel and the output shaft, the gear wheel and the output shaft to rotate at the same speed, the dynamic coupling including first circular cavities on one of the gear wheel and the output shaft, second circular cavities on the other of the gear wheel and the output shaft, with said first and second cavities facing one another and axially spaced together, respectively, and balls each positioned in a first cavity and a second cavity, respectively, the first cavity being larger than the balls to accommodate the eccentricity of the eccentric shaft.

2. The speed reduction device of claim 1, the dynamic coupling including a first surface on the gear wheel perpendicular to the axis of the gear wheel and having one of the first circular cavities and the second circular cavities in the first surface, a second surface on the output shaft perpendicular to the axis of the output shaft and having one of the second circular cavities and the first circular cavities in the second surface.

3. The speed reduction device of claim 1, the second cavities being larger than the balls to accommodate the eccentricity of the eccentric shaft.

4. The speed reduction device of claim 1, the larger of the first and second cavities having circular diameters at the edges substantially equal to the diameter of the balls plus twice the eccentric radius of the eccentric shaft.

5. The speed reduction device of claim 4, the first and second cavities being curved inwardly with a radius of curvature of substantially the radius of curvature of the balls.

6. The speed reduction device of claim 5, the smaller of the first and second cavities having circular diameters at the edges substantially equal to the diameter of the balls.

7. The speed reduction device of claim 1, the gear wheel having one less tooth than the ring gear.

8. A speed reduction device comprising a housing;

an input shaft to rotate in the housing;

an eccentric shaft to rotate with the input shaft;

a ring gear outside of the eccentric shaft, concentric with the input shaft and fixed to the housing;

a gear wheel to rotate on the eccentric shaft and engaging the ring gear, the ring gear and the gear wheel having different numbers of teeth;

an output shaft to rotate in the housing coaxially with the input shaft;

a dynamic coupling between the gear wheel and the output shaft to rotate the gear wheel and the output shaft at the same speed, including balls, a first surface on the gear wheel having first cavities in the first surface each with a constant radius of curvature substantially equal to the radius of the balls and a second surface on the output shaft facing the first surface and having second cavities in the second surface each with a surface being curved inwardly generated by a constant radius curve having a radius of curvature substantially equal to the radius of the balls and being rotated about an axis with the center of curvature of the constant radius curve at a distance from the axis equal to the eccentric radius of the eccentric shaft, the balls each being positioned in a first cavity and a second cavity, respectively.

9. The speed reduction device of claim 8, the gear wheel having one less tooth than the ring gear.

* * * * *